(12) United States Patent
Dorn et al.

(10) Patent No.: US 10,320,308 B2
(45) Date of Patent: Jun. 11, 2019

(54) COMMUTATING CIRCUIT

(71) Applicant: SIEMENS AKTIENGESELLSCHAFT, Munich (DE)

(72) Inventors: Joerg Dorn, Buttenheim (DE); Dominik Ergin, Baiersdorf (DE); Peter Menke, Oberfuellbach (DE); Bernd Utz, Erlangen (DE); Michael Weinhold, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 134 days.

(21) Appl. No.: 15/301,804

(22) PCT Filed: Apr. 4, 2014

(86) PCT No.: PCT/EP2014/056841
§ 371 (c)(1),
(2) Date: Oct. 4, 2016

(87) PCT Pub. No.: WO2015/149870
PCT Pub. Date: Oct. 8, 2015

(65) Prior Publication Data
US 2017/0126144 A1  May 4, 2017

(51) Int. Cl.
*H02M 1/00* (2006.01)
*H02M 1/32* (2007.01)
(Continued)

(52) U.S. Cl.
CPC .............. *H02M 7/06* (2013.01); *H01H 33/16* (2013.01); *H01H 33/596* (2013.01); *H01H 33/66* (2013.01); *H02M 1/00* (2013.01); *H02M 1/32* (2013.01); *H02M 7/10* (2013.01); *H02M 1/34* (2013.01); *H02M 2001/0074* (2013.01);
(Continued)

(58) Field of Classification Search
CPC ................. H01H 33/596; H01H 9/542; H01H 2009/543; H01H 9/42; H01H 33/16; H02H 3/087; H02H 9/06; H02J 3/386; H02J 3/36; H02M 1/32; H02M 2001/0074; H02M 7/06; H02M 7/062; H02M 7/10; H02M 7/12; H02M 7/125; H02M 7/19;
(Continued)

(56) References Cited
U.S. PATENT DOCUMENTS 3,562,584 A  2/1971 Yoshimura
3,809,959 A * 5/1974 Pucher ................... H01H 33/59
                                          361/13
(Continued)

FOREIGN PATENT DOCUMENTS

DE           3037951 A1    5/1982
DE      102005040432 A1    3/2007
(Continued)

*Primary Examiner* — Ryan Johnson
(74) *Attorney, Agent, or Firm* — Laurence Greenberg; Werner Stemer; Ralph Locher

(57) ABSTRACT

A commutating circuit for an electronic power converter has a first switching device, by which the electronic power converter can be electrically bridged, and a circuit part for limiting the size of the time-related voltage change of a voltage present on the first switching device. The circuit part limits the time-related voltage variation.

14 Claims, 3 Drawing Sheets

(51) Int. Cl.
  *H02M 1/34* (2007.01)
  *H02M 7/06* (2006.01)
  *H02M 7/10* (2006.01)
  *H01H 33/16* (2006.01)
  *H01H 33/59* (2006.01)
  *H01H 33/66* (2006.01)

(52) U.S. Cl.
  CPC ...... *H02M 2001/325* (2013.01); *Y02E 10/763* (2013.01); *Y02E 60/60* (2013.01)

(58) Field of Classification Search
  CPC .......... H02M 1/34; H02M 1/346; H02M 1/38; Y02E 10/763; Y02E 60/60
  See application file for complete search history.

(56) References Cited

U.S. PATENT DOCUMENTS

| | | | | |
|---|---|---|---|---|
| 3,842,335 A | * | 10/1974 | Boksjo | H02M 7/7575 307/85 |
| 5,452,170 A | * | 9/1995 | Ohde | H01H 33/596 174/DIG. 17 |
| 5,737,162 A | * | 4/1998 | Ito | H01H 33/596 361/13 |
| 8,212,371 B2 | | 7/2012 | Maibach et al. | |
| 8,390,968 B2 | | 3/2013 | Dorn et al. | |
| 2010/0118453 A1 | * | 5/2010 | Dorn | H01H 79/00 361/54 |
| 2013/0020881 A1 | * | 1/2013 | Panousis | H01H 33/596 307/113 |
| 2014/0005053 A1 | * | 1/2014 | Schacherer | H01F 38/023 505/211 |
| 2015/0116881 A1 | * | 4/2015 | Burnett | H01H 9/542 361/93.1 |
| 2016/0013653 A1 | | 1/2016 | Dorn et al. | |

FOREIGN PATENT DOCUMENTS

| | | |
|---|---|---|
| EP | 2096732 A1 | 9/2009 |
| EP | 2393088 A1 | 12/2011 |
| WO | 2008125494 A1 | 10/2008 |
| WO | 2014131457 A1 | 9/2014 |

\* cited by examiner

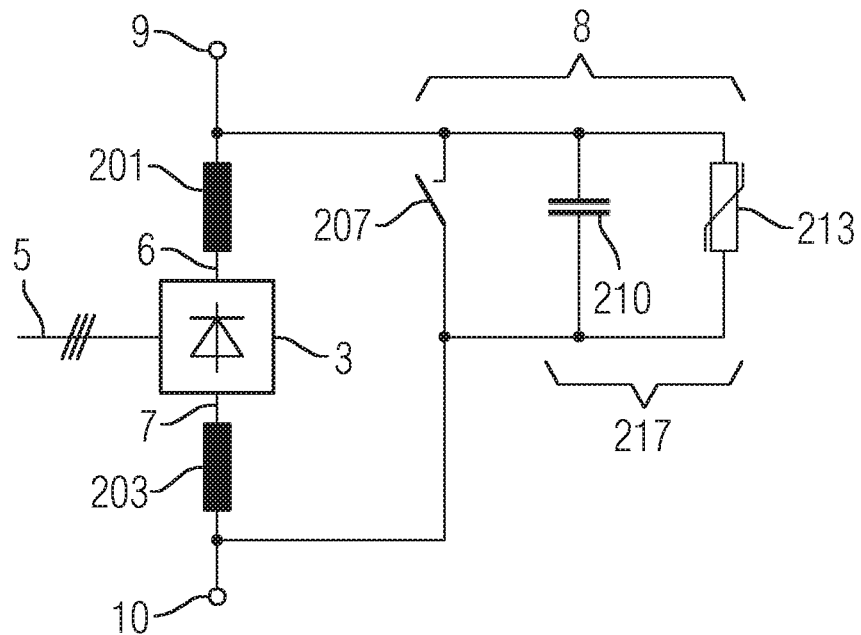
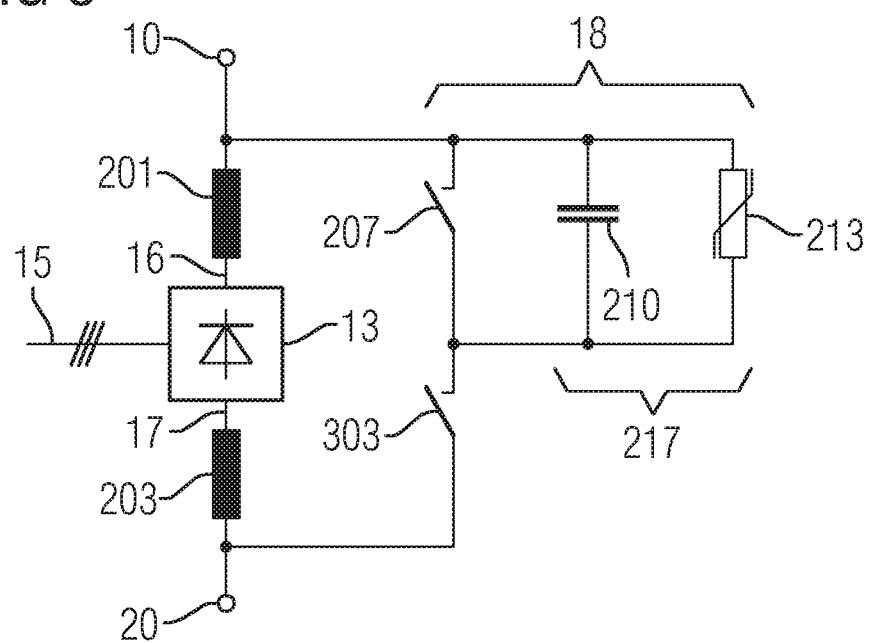

COMMUTATING CIRCUIT

BACKGROUND OF THE INVENTION

Field of the Invention

The invention relates to a commutating circuit for a power converter and a method for the commutation of an electric current.

Where the servicing of a power converter is required, a low-resistance bypass current path (bridging current path) is often provided. The function of this bypass current path is the bridging of the out-of-service power converter and the conduction of the service current. It is thus possible for a power converter to be serviced while the remainder of the installation in which the power converter is incorporated remains in service. This is particularly advantageous in installations in which power converters are electrically connected in series, for example in HVDC systems (HVDC=High Voltage Direct Current).

If the power converter which has been brought out of service during the operation of the installation is to be reconnected, it is necessary for the service current to be commutated from the bypass current path back to the power converter (i.e. on the power converter path). To this end, in HVDC applications, a special commutating circuit is known, described as a MRTB (Metallic Return Transfer Breaker). This special commutating circuit incorporates an oscillating circuit, which generates an increasing current oscillation. As a result of this increasing current oscillation, an artificial current zero-crossing is generated in a SF6 switch. This special commutating circuit is technically complex and expensive.

BRIEF SUMMARY OF THE INVENTION

The object of the invention is the proposal of a commutating circuit and a method, by means of which the service current can be simply and reliably commutated from the bridging current path to the power converter.

According to the invention, this object is fulfilled by a commutating circuit and by a method as claimed in the independent patent claims. Advantageous configurations of the commutating circuit and the method are disclosed in the dependent patent claims.

A commutating circuit for a power converter is disclosed, with a first switching device, by means of which the power converter can be electrically bridged, and a circuit part for limiting the size of the time-related variation of a voltage which occurs across the first switching device (specifically upon the opening of the first switching device). The circuit part thus limits, in an advantageous manner, the time-related voltage variation (voltage rise rate, or time-related rising voltage ramp rate). Accordingly, any arc which is generated in the first switching device upon the disconnection of the current is quenched, thereby ensuring the occurrence of a current zero-crossing in the first switching device.

The commutating circuit can be configured such that the circuit part incorporates an energy store, specifically a capacitor. The energy store, specifically the capacitor, constitutes an exceptionally simple means for limiting the size of the time-related voltage variation.

The commutating circuit can also be configured such that the circuit part incorporates a surge voltage protector, which protects the energy store, specifically the capacitor, against a voltage surge. The surge voltage protector limits the voltage on the energy store, and specifically the voltage on the capacitor. As a result, an energy store or capacitor with a relatively low voltage withstand can be used, which is available at low cost and is of compact construction.

The commutating circuit can be configured such that the power converter is a rectifier, specifically a three-phase rectifier. For example, the rectifier can be a diode rectifier. Accordingly, the commutating circuit can be advantageously employed in HVDC systems.

The commutating circuit can also be configured such that the first switching device is connected to a first DC voltage connection on the power converter and to a second DC voltage connection on the power converter. Accordingly, the power converter is bridgeable by means of the first switching device.

The commutating circuit can be constructed such that the first switching device and the circuit part form a parallel electric circuit. The commutation of the current from the first switching device to the circuit part is thus permitted in an exceptionally simple manner.

The commutating circuit can also be configured such that a second switching device is electrically arranged in series with the parallel circuit. The series connection of the second switching device and the parallel circuit increases the voltage withstand of the entire circuit.

The commutating circuit can also be configured such that the first switching device and/or the second switching device incorporates a mechanical switch, specifically a vacuum switch (for example a vacuum interrupter). The use of a mechanical switch permits the simple and cost-effective design of the commutating circuit. The use of a vacuum switch is particularly advantageous, in that vacuum switches show particularly good dielectric recovery properties after the completion of the current zero-crossing.

The commutating circuit can also be designed such that the second switching device incorporates a series circuit comprised of a plurality of mechanical switches. The voltage withstand of the entire circuit is thus further increased.

The commutating circuit can be designed such that the first switching device is connected to a first DC voltage connection on the power converter and the second switching device is connected to a second DC voltage connection on the power converter. This makes it possible for the power converter to be electrically bridged.

A power converter is also disclosed, with a commutating circuit according to one of the variants described above.

An arrangement is also disclosed comprising a plurality of power converters, each of which incorporates a commutating circuit according to one of the variants described above, and wherein the power converters are electrically connected in series.

A method is also disclosed for the commutation of an electric current by a first switching device of a commutating circuit in a power converter, wherein the power converter is bridgeable by means of the first switching device, and wherein:

the electric current initially flows through the closed (i.e. switched-in) first switching device,
  the first switching device is opened,
  thereafter, the current is commutated by the first switching device to a circuit part of the commutating circuit, wherein the circuit part limits the size of the time-related variation of a voltage which occurs across the first switching device upon the opening of the first switching device, and
  as a result of the limitation of the time-related voltage variation, a current zero-crossing is achieved in the first switching device.

It is thus particularly advantageous that the circuit part limits the size of the time-related voltage variation on the first switching device. It is thereby ensured that a current zero-crossing is achieved in the first switching device. The commutation of the current flowing in the first switching device to the power converter path is thus ensured.

The method can be executed such that
the current commutated to the circuit part charges an energy store, specifically a capacitor, and
as a result of the time-related increase in the voltage on the energy store, specifically as a result of the time-related increase in the capacitor voltage, the current is commutated from the circuit part to the power converter. To this end, the capacitor voltage acts as a commutation voltage, which drives the current into the power converter path (i.e. through the power converter).

The method can also be executed such that
the magnitude of the voltage on the energy store (i.e. of the voltage present on the energy store), specifically the magnitude of the capacitor voltage, is limited to a maximum voltage value. Accordingly, in an advantageous manner, an energy store, specifically a capacitor, with a comparatively low voltage withstand can be used. Energy stores or capacitors of this type can be obtained cost-effectively, and are of compact construction. The maximum voltage value is greater than the commutation voltage which is required for the commutation of the current from the circuit part to the power converter. The magnitude of the voltage can specifically be limited by means of a surge voltage protector.

The method can also be executed such that
the electric current initially flows through a series circuit comprised of the closed first switching device and a closed second switching device, and—after the commutation of the current to the power converter, the second switching device is opened. As a result of series connection, an exceptionally high voltage withstand of the overall circuit can be achieved.

The method also provides the advantages which are described above in relation to the commutating circuit.

BRIEF DESCRIPTION OF THE SEVERAL VIEWS OF THE DRAWING

The invention is described in greater detail hereinafter with reference to exemplary embodiments. To this end FIG. 2 shows a detailed representation of an exemplary embodiment of a power converter with a commutating circuit, FIG. 3 shows a detailed representation of a further exemplary embodiment of a power converter with a commutating circuit.

DESCRIPTION OF THE INVENTION

Figure 1:
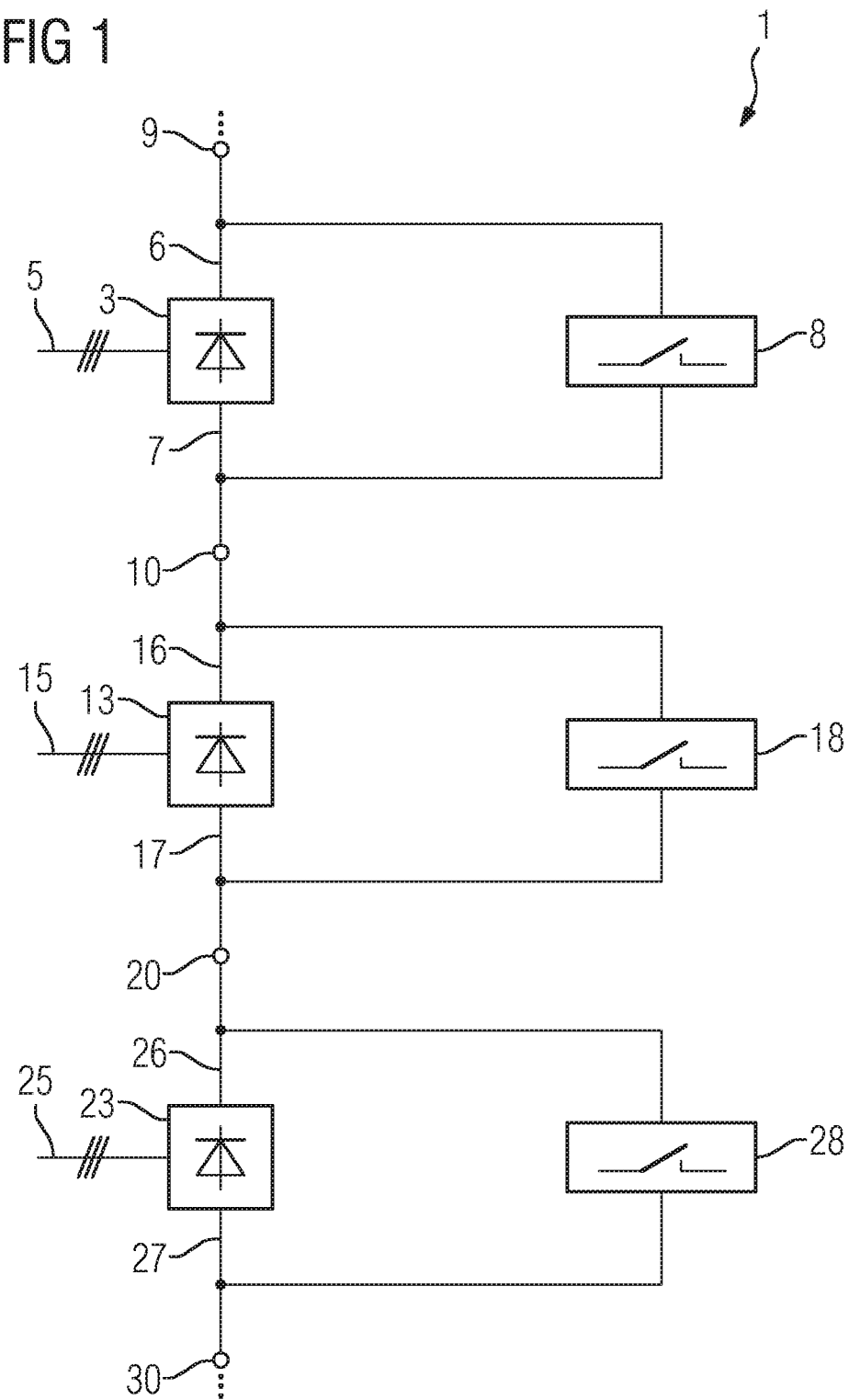
FIG. 1 shows a schematic representation of an exemplary embodiment of a series circuit comprised of a plurality of power converters, each of which incorporates a commutating circuit.

FIG. 1 shows an exemplary section of an electrical installation 1 which, for example, is used for the connection of a wind farm to a power transmission grid by means of a HVDC transmission system. The electrical installation 1 has a first power converter 3 with an AC voltage connection 5, a first DC voltage connection 6 and a second DC voltage connection 7. A first commutating circuit 8 is electrically connected in parallel to the first power converter 3. The first DC voltage connection 6 is electrically connected to a first connection point 9; the second DC voltage connection 7 is electrically connected to a second connection point 10. A power converter module is thus constituted, which comprises the first power converter 3 and the first commutating circuit 8.

FIG. 1 represents a series electric circuit comprised of the first power converter 3, a second power converter 13 and a third power converter 23. Similarly to the first power converter 3, the second power converter 13 has an AC voltage connection 15, a first DC voltage connection 16 and a second DC voltage connection 17. A second commutating circuit 18 is electrically connected in parallel to the second power converter 13. The first DC voltage connection 16 is electrically connected to the second connection point 10, and the second DC voltage connection 17 is electrically connected to a third connection point 20.

In the same manner, the third power converter 23 has an AC voltage connection 15, a first DC voltage connection 26 and a second DC voltage connection 27. A third commutating circuit 28 is electrically connected in parallel to the third power converter 23. The first DC voltage connection 26 of the third power converter 23 is electrically connected to the third connection point 20, and the second DC voltage connection 27 of the third power converter 23 is electrically connected to a fourth connection point 30.

Figure 4:
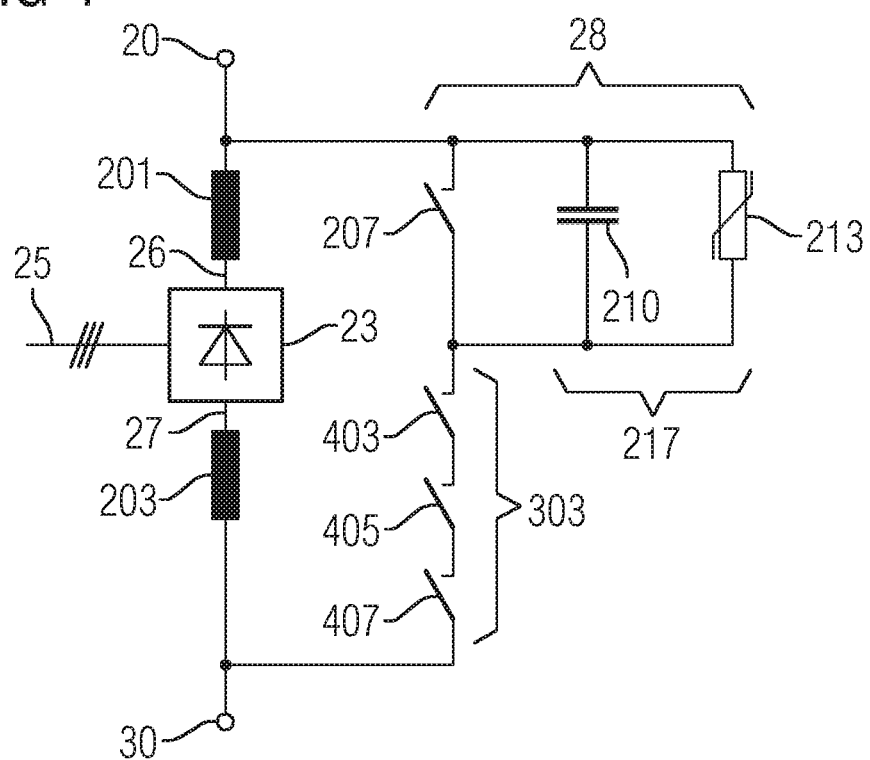
FIG. 4 shows a detailed representation of a further exemplary embodiment of a power converter with a commutating circuit.

Further power converters with further commutating circuits can be electrically connected in series to the power converters indicated. The first power converter 3, the second power converter 13 and the third power converter 23, in the exemplary embodiment, are comprised of rectifiers, for example diode rectifiers. These rectifiers generate a direct current from a three-phase alternating current which is delivered via the respective AC voltage connection 5, 15, 25. The direct current output is delivered on the first DC voltage connection 6, 16, 26 and on the second DC voltage connection 7, 17, 27. The power converters can be provided respectively with smoothing reactors in a similar arrangement, as represented in FIGS. 2 to 4. However, these smoothing reactors are not represented in FIG. 1.

FIG. 2 represents the first power converter 3 and the first commutating circuit 8. A first smoothing reactor 201 is arranged on the first DC voltage connection 6; a second smoothing reactor 203 is arranged on the second DC voltage connection 7. The first power converter 3 is electrically bridgeable by means of the first commutating circuit 8. The first commutating circuit 8 has a first switching device 207, a capacitor 210 and a surge voltage protector 213. The capacitor 210 constitutes an energy store 210. The first switching device 207 forms a low-resistance bypass current path (bridging current path) for the first power converter 3. The first switching device 207, the capacitor 210 and the surge voltage protector 213 are electrically connected in parallel. The capacitor 210 and the surge voltage protector 213 form a circuit part 217 which limits the magnitude of the time-related voltage variation (voltage change rate, or time-related voltage change rate) in a voltage on the first switching device 207. A time-related voltage variation of this type on the first switching device 207 specifically occurs upon the opening of said first switching device 207.

The first switching device 207 can specifically be configured as a vacuum switch 207 (for example a vacuum interrupter 207).

The commutating circuit 8 is advantageously designed such that, between the first switching device 207 and the capacitor 210, the lowest possible stray inductances occur. The inductance value of these unwanted stray inductances can be reduced by structural measures. Where applicable, the electrical capacitance rating of the capacitor 210 can be selected with sufficient magnitude, such that the influence of stray inductances is negligible.

FIG. 3 represents the second power converter 13, with the second commutating circuit 18. The second commutating circuit 18 only differs from the first commutating circuit 8 in that a second switching device 303 is electrically connected in series to the parallel circuit comprised of the first switching device 207, the capacitor 210 and the surge voltage protector 213. The second switching device 303 can be configured as a mechanical switch, for example as a vacuum switch or as a gas-insulated switch, with or without arc conduction capability, or as another type of mechanical switch (e.g. a disconnector). The first switching device 207 and the second switching device 303 form a low-resistance bypass current path (bridging current path) for the power converter 13. Comments made in respect of the first switching device 207, the capacitor 210 and the surge voltage protector 213 in FIG. 2 also apply here.

FIG. 4 represents the third power converter 23, with the third commutating circuit 28. The third commutating circuit 28 only differs from the second commutating circuit 18 in that the second switching device 303 is configured as a series electric circuit comprised of three switching devices: in the exemplary embodiment of FIG. 4, the second switching device 303 is implemented as a series circuit comprised of a switching device 403, a switching device 405 and a switching device 407. The switching devices 403, 405 and 407 (as per the second switching device 303 in FIG. 3) can be configured respectively as a mechanical switch, for example as a gas-insulated switch, with or without arc conduction capability, or as a vacuum switch (for example as a vacuum interrupter). The first switching device 207, the switching device 403, the switching device 405 and the switching device 407 form a low-resistance bypass current path (bridging current path) for the power converter 23.

In the exemplary embodiments shown in FIGS. 2, 3 and 4, the surge voltage protector 213 is optional in each case, and can also be omitted.

A method for the commutation of the electric current is described hereinafter with reference to FIG. 3. During the normal operation of the electrical installation 1, the first switching device 207 and the second switching device 303 are open (disconnected), and the service current flows from the third connection point 20 via the second smoothing reactor 203, the second power converter 13 and the first smoothing reactor 201 to the second connection point 10. If the second power converter 13 requires servicing, the second switching device 303 and the first switching device 207 are closed. As a result, the second power converter 13 is electrically bridged. The service current of the electrical installation 1 continues to flow, but is now generated by the other power converters which are electrically connected in series (i.e. in this case by the first power converter 3 and the third power converter 23). This service current will then flow from the third connection point 20 via the second switching device 303 and the first switching device 207 to the second connection point 10.

If the second power converter 13 is now to be restored to service, the service current flowing via the second switching device 303 and the first switching device 207 must be commutated to the second power converter 13. To this end, the first switching device 207 is opened. As a result of the (high) service current flowing, an arc is generated between the switching contacts of the first switching device. In this case, the first switching device 207 is configured as a vacuum switch (e.g. as a vacuum interrupter). The arcing voltage of the arc in the vacuum switch is comprised of a combination of the root voltages of the arc (which are essentially independent of the current) and an ohmic voltage component (which is current-related).

This arcing voltage results in the commutation of the current from the path of the first switching device 207 to the current path of the capacitor 210. The time-related voltage variation on the capacitor is limited by the magnitude of the capacitance rating of the capacitor. The capacitance of the capacitor is thus selected such that the current can be fully commutated to the path of the capacitor before the capacitor is charged to a voltage which is greater than the arcing voltage of the switching device 207. If this can be ensured, the arc in the switching device 207 will be quenched.

If the arc in the first switching device 207 is quenched, the service current will be fully commutated to the current path of the capacitor 210. This capacitor is recharged accordingly, and the capacitor voltage increases. This capacitor voltage acts as a commutation voltage, and ensures that the service voltage is commutated from the path of the capacitor 210 to the current path of the second power converter 13. Immediately the service current is fully commutated to the second power converter 13, the second switching device 303 is opened. As this occurs in a zero-current state, the second switching device 303, under ideal circumstances, does not need to be arc-resistant, but a switch with arc conduction capability can naturally also be used as the second switching device 303. The process for the commutation of the service current from the first switching device 207 to the second power converter 13 is thus completed. The second power converter 13 can now be reconnected. The construction of a voltage on the second power converter 13 commences thereafter.

The charging voltage of the capacitor 210 is limited to a predefined value by the surge voltage protector 213. The requisite insulation capacity, and thus the design rating of the capacitor 210, can be limited accordingly. However, the circuit will function, even in the absence of the surge voltage protector 213. In this case, the capacitor 210 must be designed to deliver a sufficient voltage withstand for the voltages arising.

In the exemplary embodiment shown in FIG. 3, only an increase in electrical insulation capacity/voltage withstand is associated with the second switching device 303. This is specifically advantageous if the DC voltage generated by the second power converter 13 during the service thereof exceeds the insulation capacity of the first switching device 207. However, the circuit can also operate without the second switching device 303, resulting in the circuit represented in FIG. 2. In this case, the design rating of the first switching device 207 must be such that it is capable of accommodating DC voltages generated, even in the event of the operation of the power converter 13.

By means of the commutating circuits described, and the method described, direct currents of, for example, up to several kA can be commutated in the power converter. The commutating circuit (specifically the rating and the voltage withstand of the capacitor) is designed in consideration of the currents flowing in the power converters and the rating of the smoothing reactors.

The solution envisaged can specifically be advantageously used for the connection of offshore wind turbine installations, e.g. an offshore wind farm, by means of HVDC transmission to a land-based electricity supply system. It is specifically advantageous that the use of a first switching device and a second switching device (as represented in FIG. 3) delivers a high insulation capacity, without the necessity for the capacitor to be rated to the full nominal DC voltage. This is made possible in that, by means of the commutating circuit, only the commutation voltage needs to be delivered. The means that the capacitor 210 only needs to be charged until such time as the capacitor voltage exceeds the commutation voltage.

Advantageously, in the simplest case, the commutating circuit is comprised only of the first switching device, with a parallel-connected capacitor. Optionally, the capacitor voltage can advantageously be limited e.g. by means of a surge voltage protector. The use of a second switching device (which, where applicable, can again be comprised of a series circuit of a plurality of switching devices) advantageously increases the insulation capacity of the commutating circuit, without the necessity for the capacitor to be rated to the full voltages arising.

A commutating circuit and a method have been described, by means of which an electric current can simply and reliably be commutated from a current path which bridges a power converter back to the power converter.

The invention claimed is:

1. A commutating circuit for a power converter, the commutating circuit comprising:
 a first switching device having a first terminal and a second terminal;
 a second switching device; and
 a circuit part for limiting a size of a time-related variation of a voltage which occurs across said first switching device, said circuit part having an energy store connected in parallel with said first switching device, said energy store having a first terminal connected directly to said first terminal of said first switching device and a second terminal connected directly to said second terminal of said first switching device;
 said first switching device and said circuit part together forming a parallel electric circuit;
 said second switching device being electrically connected in series with said parallel electric circuit to form an electrical series circuit disposed to bridge the power converter.

2. The commutating circuit according to claim 1, wherein said circuit part has a surge voltage protector for protecting said energy store against a voltage surge.

3. The commutating circuit according to claim 1, wherein the power converter is a rectifier.

4. The commutating circuit according to claim 1, wherein said first switching device is connected to a first DC voltage connection and, via said second switching device, to a second DC voltage connection on the power converter.

5. The commutating circuit according to claim 1, wherein at least one of said first switching device or said second switching device has a mechanical switch.

6. The commutating circuit according to claim 1, wherein said second switching device is a series circuit containing a plurality of mechanical switches.

7. The commutating circuit according to claim 1, wherein said first switching device is connected to a first DC voltage connection on the power converter and said second switching device is connected to a second DC voltage connection on the power converter.

8. The commutating circuit according to claim 1, wherein said energy store is a capacitor.

9. The commutating circuit according to claim 5, wherein said mechanical switch is a vacuum switch.

10. A power converter, comprising:
 a commutating circuit containing a switching device and a circuit part for limiting a size of a time-related variation of a voltage which occurs across said switching device, said circuit part having an energy store connected in parallel with said switching device, said energy store having a first terminal connected directly to a first terminal of said switching device and a second terminal connected directly to a second terminal of said switching device;
 said first switching device and said circuit part forming a parallel electric circuit; and
 a second switching device electrically connected in series with said parallel electric circuit to form an electrical series circuit disposed to bridge the power converter.

11. An arrangement, comprising:
 a plurality of power converters electrically connected in series, each of said power converters containing a commutating circuit having a switching device by which a respective one of said power converters is electrically bridged and a circuit part for limiting a size of a time-related variation of a voltage which occurs across said switching device, each said circuit part having an energy store connected in parallel with said switching device, said energy store having a first terminal connected directly to a first terminal of said switching device and a second terminal connected directly to a second terminal of said switching device
 said first switching device and said circuit part forming a parallel electric circuit; and
 a second switching device electrically connected in series with said parallel electric circuit to form an electrical series circuit disposed to bridge the power converter.

12. A method for commutation of an electric current by a first switching device of a commutating circuit in a power converter, the power converter being bridgeable by means of the first switching device and a second switching device connected in series with the first switching device, which comprises the steps of:
 flowing the electric current initially through a closed first switching device and a closed second switching device connected in series with the first switching device;
 opening the first switching device; and
 providing a circuit part with an energy store connected in parallel with said first switching device, the circuit part being a part of the commutating circuit and the energy store having a first terminal connected directly to a first terminal of the first switching device and a second terminal connected directly to a second terminal of the first switching device;
 commutating the electric current by the first switching device to the circuit part of the commutating circuit, using the circuit part to limit a size of a time-related variation of a voltage which occurs across the first switching device upon the opening of the first switching device, and as a result of a limitation of the time-related variation of the voltage, achieving a current zero-crossing in the first switching device; and
 charging the energy store with the current commutated to the circuit part and, as a result of a time-related increase in the voltage on the energy store, commutating the electric current from the circuit part to the power converter; and after commutation of the electric current to the power converter, opening the second switching device.

13. The method according to claim 12, wherein the energy store includes a capacitor and, as a result of the time-related increase in a capacitor voltage of the capacitor, the electric current is commutated from the circuit part to the power converter.

14. The method according to claim 13, which further comprises limiting a magnitude of the capacitor voltage to a maximum voltage value.

* * * * *